United States Patent
Kuronuma et al.

(10) Patent No.: US 11,692,252 B2
(45) Date of Patent: *Jul. 4, 2023

(54) DUPLEX STAINLESS CLAD STEEL PLATE AND METHOD OF PRODUCING SAME

(71) Applicant: JFE STEEL CORPORATION, Tokyo (JP)

(72) Inventors: Yota Kuronuma, Tokyo (JP); Hirofumi Ohtsubo, Tokyo (JP); Tomoyuki Yokota, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 407 days.

This patent is subject to a terminal disclaimer.

(21) Appl. No.: 17/042,184

(22) PCT Filed: Mar. 28, 2019

(86) PCT No.: PCT/JP2019/013898
§ 371 (c)(1),
(2) Date: Sep. 28, 2020

(87) PCT Pub. No.: WO2019/189708
PCT Pub. Date: Oct. 3, 2019

(65) Prior Publication Data
US 2021/0025044 A1    Jan. 28, 2021

(30) Foreign Application Priority Data
Mar. 30, 2018    (JP) .................................. 2018-069303

(51) Int. Cl.
*C22C 38/48*    (2006.01)
*C21D 8/02*    (2006.01)
*C22C 38/44*    (2006.01)

(52) U.S. Cl.
CPC ............ *C22C 38/48* (2013.01); *C21D 8/0205* (2013.01); *C21D 8/0226* (2013.01); *C22C 38/44* (2013.01);
(Continued)

(58) Field of Classification Search
None
See application file for complete search history.

(56) References Cited

U.S. PATENT DOCUMENTS 5,539,172 A    7/1996 Takase et al.
8,562,758 B2    10/2013 Fujisawa et al.
(Continued)

FOREIGN PATENT DOCUMENTS

CN    1914344 A    2/2007
CN    104781439 A    7/2015
(Continued)

OTHER PUBLICATIONS

Noriki et al., JPH0636993B2 Google Patents machine translation printed on Jan. 5, 2022, May 18, 1994, entire translation (Year: 1994).*
(Continued)

*Primary Examiner* — Anthony M Liang
(74) *Attorney, Agent, or Firm* — Kenja IP Law PC

(57) ABSTRACT

Disclosed is a duplex stainless clad steel plate in which a duplex stainless steel plate as a cladding metal is bonded or joined to one or both surfaces of a base steel plate, in which the base steel plate comprises a predetermined chemical composition such that Nb/N is 3.0 or more and Ceq is 0.35 to 0.45, and the duplex stainless steel plate comprises: a predetermined chemical composition such that PI is 33.0 to 38.0; and a microstructure containing a ferrite phase in an area fraction of 35% to 65%, and in the microstructure, an (Continued)

amount of precipitated Cr is 1.00% or less and an amount of precipitated Mo is 0.50% or less.

2 Claims, 1 Drawing Sheet

(52) U.S. Cl.
 CPC .. *C21D 2211/001* (2013.01); *C21D 2211/005* (2013.01)

(56) References Cited

U.S. PATENT DOCUMENTS

| | | |
|---|---|---|
| 2013/0288074 A1 | 10/2013 | Tsuge et al. |
| 2015/0030883 A1 | 1/2015 | Yazawa et al. |
| 2015/0292069 A1 | 10/2015 | Kishi et al. |

FOREIGN PATENT DOCUMENTS

| | | |
|---|---|---|
| CN | 107075645 A | 8/2017 |
| CN | 107354397 A | 11/2017 |
| EP | 1416059 A1 | 5/2004 |
| EP | 3219820 B1 | 8/2020 |
| JP | H02284777 A | 11/1990 |
| JP | H03285016 A | 12/1991 |
| JP | H05261567 A | 10/1993 |
| JP | H0636993 B2 * | 5/1994 |
| JP | H06320334 A | 11/1994 |
| JP | 2000061655 A | 2/2000 |
| JP | 2008030086 A | 2/2008 |
| JP | 2012149309 A | 8/2012 |
| JP | 5268105 B2 | 8/2013 |
| JP | 2014114466 A | 6/2014 |
| JP | 2018028146 A | 2/2018 |
| WO | 2013132863 A1 | 9/2013 |
| WO | 2014148540 A1 | 9/2014 |

OTHER PUBLICATIONS

Hideo et al., JP5268105B2 Google Patents machine translation printed on Jan. 5, 2022, Aug. 21, 2013, entire translation (Year: 2013).*

Ispat Guru, "Nitrogen in Steels", May 23, 2013, URL: <https://www.ispatguru.com/nitrogen-in-steels/>, pp. 1-10 (Year: 2013).*

Jun. 11, 2019, International Search Report issued in the International Patent Application No. PCT/JP2019/013898.

Oct. 20, 2021, Office Action issued by the Korean Intellectual Property Office in the corresponding Korean Patent Application No. 10-2020-7028715 with English language concise statement of relevance.

Nov. 23, 2020, the Extended European Search Report issued by the European Patent Office in the corresponding European Patent Application No. 19777811.1.

May 18, 2021, Office Action issued by the China National Intellectual Property Administration in the corresponding Chinese Patent Application No. 201980022207.X with English language search report.

Zheng Chuanbo et al., Hydrogen Induced Fracture Theory and Application of Duplex Stainless Steel for Pressure Vessel, 2017, pp. 51-52, National Defense Industry Press.

* cited by examiner

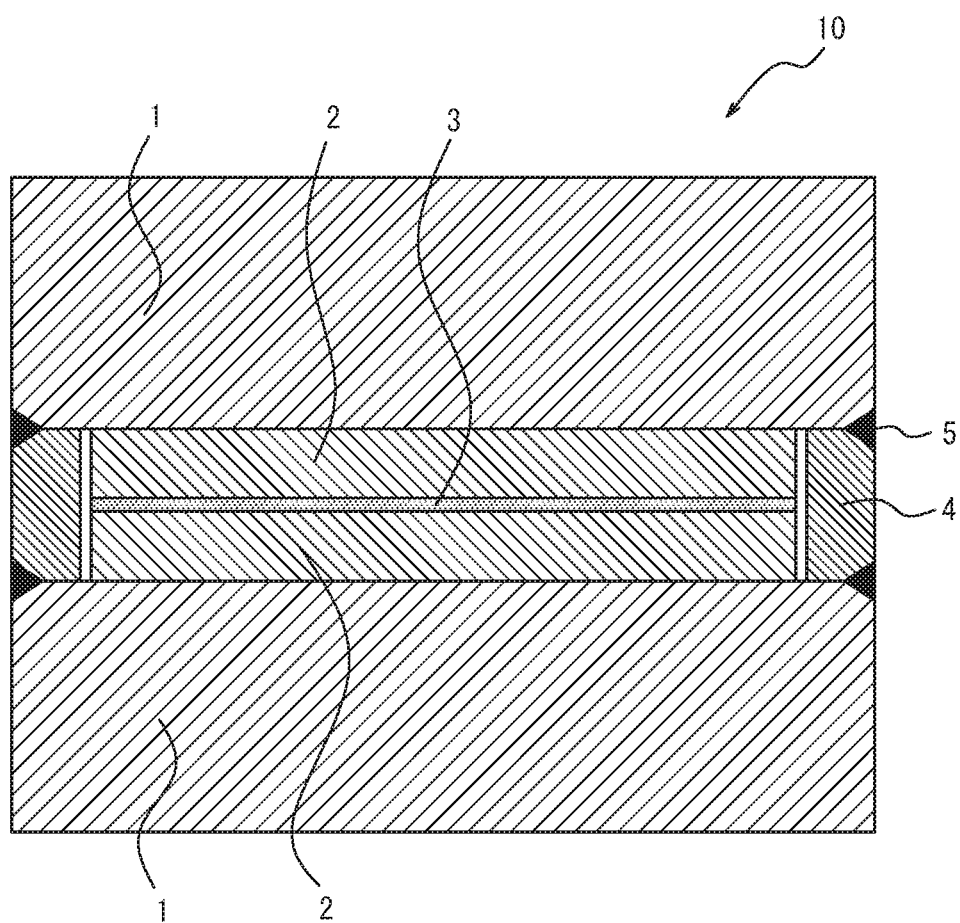

DUPLEX STAINLESS CLAD STEEL PLATE AND METHOD OF PRODUCING SAME

TECHNICAL FIELD

This disclosure relates to a duplex stainless clad steel plate used for, e.g., a reaction vessel of a chemical plant, and to a method of producing the same.

BACKGROUND

Conventionally, duplex stainless steel has been adopted under high chloride environment such as seawater or under severe corrosive environment such as oil wells or gas wells. Specifically, duplex stainless steel is adopted in piping in oil wells and gas wells, structural members such as in flue gas desulfurization equipment, wastewater treatment plants, and seawater pumping power generators, paper making rolls, centrifugal separators, pumps and valves, heat exchangers, and so on. The duplex stainless steel is a stainless steel having a complex structure in which two phases of austenite phase and ferrite phase are mixed, and has both excellent corrosion resistance and excellent strength properties. This steel is generally known to have most excellent corrosion resistance when the area ratio (phase fraction) of austenitic phase to ferrite phase is approximately 1:1. Therefore, the practical chemical composition of the duplex stainless steel is set such that the area ratio (phase fraction) of austenite phase to ferrite phase is almost within this range. From this point of view, for example, SUS329J1, SUS329J3L, and SUS329J4L are standardized as steel bars and plate materials in Japanese Industrial Standards (JIS). In addition, SUS329J1FB as forged steel products and SCS10 as cast steel products are standardized.

On the other hand, prices of alloying elements represented by Cr, Ni, and Mo, which are the main raw materials of duplex stainless steel, sometimes have soaring and great fluctuations. Accordingly, from the perspective of making use of excellent corrosion resistance of duplex stainless steel, it may be more economically feasible to use a duplex stainless steel as a clad steel having the same thickness as a solid metal than to use as a solid metal.

A clad steel plate is a steel plate where two or more steel plates having different properties are bonded or joined together, such as a steel plate obtained by bonding or joining a high-alloy steel material showing high corrosion resistance as a cladding metal to a base steel plate made of a so-called common steel material such as carbon steel. A clad steel plate is formed by metallurgically bonding or joining two types of metals having different properties, and unlike platings, there is no concern of peeling. Further, a clad steel plate has various properties which cannot be achieved with a single metal or alloy.

For example, by selecting a steel material having corrosion resistance according to the operating environment as a cladding metal, it is possible to provide corrosion resistance equivalent to that of a solid metal while suppressing the use amount of expensive alloying elements. In addition, high strength and high toughness carbon steel and low-alloy steel can be applied to the base steel plate. As such, in a clad steel plate, it is possible to provide corrosion resistance equivalent to that of a solid metal while suppressing the use amount of expensive alloying elements, as well as strength and toughness equivalent to those of carbon steel and low-alloy steel. Therefore, a clad steel plate has an advantage that it can offer both cost advantage and functionality.

For this reason, a clad steel plate using a high-alloy steel material as a cladding metal is considered to be a very useful functional steel material, and in recent years the needs thereof have been increasing more and more in various industrial fields.

As a technique relating to such a clad steel plate, JP200061655A (PTL 1) describes "a base metal for clad steel having excellent toughness while being solutionized, comprising a chemical composition containing, by wt %, C: 0.15% or less, Si: 0.5% or less, Mn: 1.5% or less, Ni: 3.0% or less, Ti: 0.008% to 0.025%, B: 0.0004% to 0.0020%, and N: 0.006% to 0.015%, with the balance being Fe and inevitable impurities (claim 1)".

CITATION LIST

Patent Literature

PTL 1: JP200061655A

SUMMARY

Technical Problem

In particular, SUS316L clad steel has been used as a material for reaction containers of chemical plants. In recent years, there is an increasing demand for alternative duplex stainless clad steel such as SUS329J3L clad steel which is more corrosion resistant than SUS316L clad steel. However, our study revealed that the conventional duplex stainless clad steel plates are insufficient in terms of corrosion resistance when used as cladding metal. Since PTL 1 describes a cladding metal of clad steel only as having appropriate material properties, it is not possible to identify the characteristics of the clad steel as a whole obtained by combining the cladding metal and the base metal. For this reason, sufficient corrosion resistance can not be obtained in the clad steel using the base metal described in PTL 1.

Further, in recent years, the use of clad steel in low temperature environment such as cold districts is increasing, and higher base metal strength and toughness are required for clad steel.

It would thus be helpful to provide a duplex stainless clad steel plate excellent in the corrosion resistance of a cladding metal and in the strength and toughness of a base metal, and a method of producing the same.

Solution to Problem

As a result of intensive studies made to solve the above problems, we discovered the following.

In duplex stainless steel used for duplex stainless clad steel, various properties may change in accordance with a change in metallic structure due to thermal influence. For example, the ferrite phase increases in a high temperature range of the melting point to 1200° C. In an intermediate temperature range of 600° C. to 900° C., heterogeneous phases, e.g., intermetallic compounds such as sigma phase and carbonitrides are precipitated. In a low temperature range of 450° C. to 500° C., a reaction considered as decomposition of the ferrite phase occurs. As described above, the metallic structure changes in respective temperature ranges, and corrosion resistance and strength properties change accordingly. Among the above-mentioned structural changes, precipitation of intermetallic compounds such as sigma phase, carbides such as $Cr_{23}C_6$, and nitrides such as $Cr_2N$ is a problem. When at least one of sigma phase, a carbide, a nitride, or a carbonitride is precipitated, a depletion layer of a corrosion-resistant element such as Cr or Mo is formed around the precipitate, and the corrosion resistance is remarkably deteriorated.

In order to improve the corrosion resistance in duplex stainless steel, it is conceivable to alter the alloy components. For example, if the Cr content is decreased, sigma phase precipitation is less likely to occur. This is because sigma phase is basically structured such that Fe:Cr=1:1. Likewise, sigma phase precipitation can be delayed by reducing the Mo content. However, if the Cr and Mo contents are reduced, the corrosion resistance of the matrix phase of the cladding metal is adversely affected. That is, the delay in the sigma phase precipitation in this method would cause deterioration in corrosion resistance as a whole. It is thus not preferable to reduce the content of Cr or Mo unconditionally. Also, if the C content is decreased, carbides are less likely to precipitate. However, an extremely lowered C content increases the smelting load, resulting in increased manufacturing costs.

As described above, there has not been established any method that can increase the corrosion resistance of the cladding metal as a whole by preventing precipitation of sigma phase, carbides, and the like in the duplex stainless steel in other ways than improving alloy components. In particular, in the case of producing a clad steel, the restriction of maintenance of the mechanical properties of the base metal makes it difficult to carry out solution treatment to dissolve sigma phase, carbides, and the like, and the problem of deterioration of the corrosion resistance of a duplex stainless steel of a cladding metal resulting from precipitation of sigma phase, carbides, and the like remains to be solved.

We investigated the relationship between precipitates and corrosion resistance using various test materials made of duplex stainless steel. As a result, corrosion resistance deterioration was found to be caused by precipitates such as sigma phase, carbides, nitrides, and carbonitrides. Further, with respect to a duplex stainless steel of a cladding metal, it was discovered that there is a correlation between the amounts of Cr and Mo contained in these precipitates (that is, the amounts of Cr and Mo present as precipitates) and corrosion resistance.

It was further discovered that the strength and toughness of the base metal are improved by limiting the index Ceq defined by a predetermined relational expression and Nb/N to the predetermined ranges with respect to the chemical composition of the base metal. The present disclosure was completed based on these discoveries, and primary features thereof are as described below.

[1] A duplex stainless clad steel plate in which a duplex stainless steel plate as a cladding metal is bonded or joined to one or both surfaces of a base steel plate, wherein the base steel plate comprises a first chemical composition containing (consisting of), in mass %, C: 0.06% to 0.25%, Si: 0.05% to 0.50%, Mn: 0.70% to 1.60%, P: 0.030% or less, S: 0.010% or less, Al: 0.005% to 0.100%, Mo: 0.01% to 0.15%, Nb: 0.010% to 0.040%, Ti: less than 0.005%, and N: 0.0010% to 0.0100%, with the balance being Fe and inevitable impurities, in a range such that Nb/N is 3.0 or more and Ceq represented by the following Expression (1) is 0.35 to 0.45:

$$Ceq=C+Mn/6+(Cu+Ni)/15+(Cr+Mo+V)/5 \quad (1),$$

where the symbol of each element indicates the content in mass % of the element, and any element not contained is calculated as 0, the duplex stainless steel plate comprises: a second chemical composition containing (consisting of), in mass %, C: 0.030% or less, Si: 1.00% or less, Mn: 2.00% or less, P: 0.0400% or less, S: 0.0100% or less, Ni: 4.50% to 7.00%, Cr: 21.0% to 24.0%, Mo: 2.5% to 3.5%, and N: 0.08% to 0.20%, with the balance being Fe and inevitable impurities, in a range such that PI defined by the following Expression (2) is 33.0 to 38.0:

$$PI=Cr+3.3Mo+16N \quad (2),$$

where the symbol of each element indicates the content in mass % of the element; and a microstructure containing a ferrite phase in an area fraction of 35% to 65%, and in the microstructure, an amount of precipitated Cr is 1.00% or less and an amount of precipitated Mo is 0.50% or less.

[2] The duplex stainless clad steel plate according to [1], wherein the second chemical composition of the duplex stainless steel plate further contains, in mass %, at least one selected from the group consisting of Cu: 1.50% or less, W: 1.50% or less, Co: 1.50% or less, Ti: 0.25% or less, and Nb: 0.25% or less.

[3] The duplex stainless clad steel plate according to [1] or [2], wherein the first chemical composition of the base steel plate further contains, in mass %, at least one selected from the group consisting of Cu: 0.50% or less, Ni: 0.50% or less, Cr: 0.40% or less, and V: 0.050% or less.

[4] A method of producing a duplex stainless clad steel plate in which a duplex stainless steel plate as a cladding metal is bonded or joined to one or both surfaces of a base steel plate, the method comprising: preparing a clad slab by stacking a first blank plate to be the base steel plate and a second blank plate to be the duplex stainless steel plate as the cladding metal in a layered manner, the first blank plate comprising the first chemical composition as recited in [1] or [3], and the second blank plate comprising the second chemical composition as recited in [1] or [2] and a microstructure containing a ferrite phase in an area fraction of 35% to 65%; heating the clad slab to 1050° C. to 1250° C.; then hot rolling the clad slab with a rolling reduction ratio of 2.0 or more to obtain a rolled clad body in which the base steel plate and the duplex stainless steel plate are bonded or joined together; allowing the rolled clad body to naturally cool; then reheating the rolled clad body to 950° C. to 1100° C.; then cooling the rolled clad body such that the duplex stainless steel plate is cooled at a cooling rate of 0.3° C./s or higher and the base steel plate is cooled at a cooling rate of 1.0° C./s or higher; and then tempering the rolled clad body at 700° C. or lower.

Advantageous Effect

According to the method of producing a duplex stainless clad steel plate disclosed herein, it is possible to produce a duplex stainless clad steel plate excellent in the corrosion resistance of the cladding metal and in the strength and toughness of the base metal. The duplex stainless clad steel plate disclosed herein is excellent in all of the corrosion resistance of the cladding metal and the strength and toughness of the base metal.

BRIEF DESCRIPTION OF THE DRAWING

FIG. 1 is a schematic cross-sectional view of a clad slab.

DETAILED DESCRIPTION (Duplex Stainless Clad Steel Plate)

One of the embodiments of the present disclosure relates to a duplex stainless clad steel plate in which a duplex stainless steel plate as a cladding metal is bonded or joined to one or both surfaces of a base steel plate. The thickness of the duplex stainless clad steel plate is not particularly limited, yet is preferably 6 mm to 45 mm. Also, the thicknesses of the base steel plate and the cladding metal are preferably about 5 mm to 40 mm and 1 mm to 5 mm, respectively. In this embodiment, it is possible to achieve both improvement of pitting corrosion resistance and improvement of strength and toughness by using a duplex stainless clad steel in which a specific base metal is combined with a specific cladding metal.

Hereinafter, the chemical compositions of the base steel plate and the cladding metal which are components of the duplex stainless clad steel will be described in detail. Hereinafter, the unit "%" relating to the content of elements in the chemical composition refers to "mass %" unless specified otherwise.

[Chemical Composition of Base Steel Plate]

By using a low-carbon steel having the following chemical composition for the base steel plate, it is possible to provide a duplex stainless clad steel excellent in mechanical properties such as strength and toughness.

C: 0.06% to 0.25%

C is an element for increasing the strength of steel, and when it is contained in an amount of 0.06% or more, sufficient strength is exhibited. Therefore, the C content is 0.06% or more, and preferably 0.08% or more. However, when the C content exceeds 0.25%, weldability and toughness are deteriorated. Therefore, the C content is set to 0.25% or less, and preferably 0.20% or less.

Si: 0.05% to 0.50%

Si is effective for deoxidation and is contained in an amount of 0.05% or more in order to improve the strength of steel. Also, Si is an element inevitably entering into steel from raw materials such as iron ore, and keeping the Si content below 0.05% leads to an increase in cost in the steelmaking process. Therefore, the Si content is 0.05% or more, and preferably 0.10% or more. However, a Si content of greater than 0.50% can lead to deterioration in the surface characteristics and toughness of the steel. Therefore, the Si content is 0.50% or less, and preferably 0.45% or less.

Mn: 0.70% to 1.60%

Mn is an element that increases the strength of steel. This effect is exhibited when Mn is contained in an amount of 0.70% or more. Therefore, the Mn content is 0.70% or more, and preferably 1.00% or more. However, when the Mn content exceeds 1.60%, the weldability is impaired and the alloy cost also increases. Therefore, the Mn content is 1.60% or less.

P: 0.030% or Less

P is an inevitable impurity in the steel, and when the P content exceeds 0.030%, the toughness deteriorates. Therefore, the P content is 0.030% or less, preferably 0.020% or less, and more preferably 0.015% or less. However, from the viewpoint of the dephosphorization cost, the P content is preferably 0.0001% or more.

S: 0.010% or Less

As in P, S is also an inevitable impurity in steel. When the S content exceeds 0.010%, the toughness deteriorates. Therefore, the S content is 0.010% or less, preferably 0.005% or less, and more preferably 0.003% or less. However, from the viewpoint of desulfurization cost, the S content is preferably 0.0001% or more, and more preferably 0.0003% or more.

Al: 0.005% to 0.100%

Al is added as a deoxidizing agent. Al exhibits a deoxidizing effect when contained in an amount of 0.005% or more. Therefore, the Al content is 0.005% or more, and preferably 0.010% or more. However, an Al content of more than 0.100% can lead to deterioration in the toughness of the welded portion. Therefore, the Al content is 0.100% or less, and preferably 0.070% or less.

Mo: 0.01% to 0.15%

Mo is an element for increasing the hardenability of steel, and improves the strength and toughness of the steel after rolling. This effect is exhibited when the Mo content is 0.01% or more. Therefore, the Mo content is 0.01% or more, and preferably 0.05% or more. However, a Mo content of more than 0.15% can lead to deterioration in weldability. Therefore, the Mo content is 0.15% or less.

Nb: 0.010% to 0.040%

Nb precipitates as a Nb nitride, having the effect of suppressing the coarsening of austenite grains and increasing the strength and toughness of steel. Nb also has the effect of expanding the recrystallization temperature range to low temperature range during rolling in the austenite region, thereby enabling refinement of grains and increasing the toughness. These effects are obtained by containing 0.010% or more. Therefore, the Nb content is 0.010% or more, preferably 0.013% or more, and more preferably 0.015% or more. However, when the Nb content exceeds 0.040%, coarse Nb nitride is formed, deteriorating the toughness. Therefore, the Nb content is 0.040% or less, preferably 0.035% or less, and more preferably 0.030% or less. Further, by setting the below-described ratio with respect to the nitrogen atom to be not less than a predetermined value, the effect of suppressing coarsening of austenite grains can be further enhanced.

Ti: Less Than 0.005%

In the case of this embodiment containing Nb as an essential element, Ti forms a composite carbide and/or composite nitride with Nb. With the Nb content specified in this embodiment, it was confirmed that coarse composite carbides and/or composite nitrides of Ti and Nb are formed when the Ti content is 0.005% or more, causing the toughness to deteriorate. Therefore, the Ti content is less than 0.005%, preferably 0.003% or less, and more preferably 0.001% or less. The Ti content is preferably reduced as much as possible, yet may be, for example, 0.0001% or more, or 0.0003% or more.

N: 0.0010% to 0.0100%

N is an element indispensable for formation of Nb nitride, and a Nb nitride is formed when the N content is 0.0010% or more. Therefore, the N content is 0.0010% or more, preferably 0.0020% or more, and more preferably 0.0025% or more. However, a N content of more than 0.0100% can lead to deterioration in weldability and toughness. Therefore, the N content is 0.0100% or less, preferably 0.0070% or less, and more preferably 0.0050% or less. Further, by setting the below-described ratio with respect to Nb to be not less than a predetermined value, it is considered that the effect of suppressing coarsening of γ grains (austenite grains) can be further enhanced.

Nb/N: 3.0 or More

When Nb/N is 3.0 or more, the precipitation of Nb nitride and the effect of solute Nb are fully developed. However, when Nb/N is less than 3.0, the toughness remarkably deteriorates due to the presence of solute N in the steel. Therefore, Nb/N is set to 3.0 or more, and preferably 3.5 or more. Further, Nb/N can be 20.0 or less.

Ceq: 0.35 to 0.45

Ceq is an index of the hardenability of steel and is represented by:

$$Ceq = C + Mn/6 + (Cu+Ni)/15 + (Cr+Mo+V)/5 \quad (1),$$

where the symbol of each element indicates the content in mass % of the element, and any element not contained is calculated as 0.

By setting Ceq to 0.35 or more, it is possible to secure sufficient hardenability and to provide the steel with good strength and toughness. Therefore, Ceq is set to 0.35 or more, and preferably 0.38 or more. However, when Ceq exceeds 0.45, the weldability is impaired. Therefore, Ceq is set to 0.45 or less.

In addition to the above basic components, the steel may further contain, as optional component(s), at least one selected from the group consisting of Cu: 0.50% or less, Ni: 0.50% or less, Cr: 0.40% or less, and V: 0.050% or less.

Cu: 0.50% or Less

Cu is an element for increasing the hardenability of steel, and improves the strength and toughness of the steel after rolling. This effect is exerted when the Cu content is 0.01% or more. Therefore, in the case of expecting improvement of hardenability being accomplished by adding Cu, it is preferable to set the Cu content to 0.01% or more, and more preferably to 0.05% or more. However, a Cu content of more than 0.50% can lead to deterioration in weldability and toughness. Therefore, when Cu is added, the Cu content is set to 0.50% or less.

Ni: 0.50% or Less

Ni is an element which improves the hardenability of steel and is particularly effective for increasing toughness. This effect is exerted when the Ni content is 0.01% or more. Therefore, in the case of expecting improvement of hardenability being accomplished by adding Ni, it is preferable to set the Ni content to 0.01% or more, and more preferably to 0.05% or more. However, when the Ni content exceeds 0.50%, the weldability is impaired and the alloy cost also increases. Therefore, when Ni is added, the Ni content is set to 0.50% or less.

Cr: 0.40% or Less

As with Cu, Cr is an element for improving the hardenability of steel, and improves the strength and toughness of the steel after rolling. This effect is exerted when the Cr content is 0.01% or more. Therefore, in the case of expecting this effect being accomplished by adding Cr, it is preferable to set the Cr content to 0.01% or more, and more preferably to 0.05% or more. However, a Cr content of more than 0.40% can lead to deterioration in weldability and toughness. Therefore, when Cr is added, the Cr content is set to 0.40% or less.

V: 0.050% or Less

V is an element that improves the strength of steel by forming carbonitride. This effect is exerted when the V content is 0.001% or more. Therefore, in the case of expecting this effect being accomplished by adding V, it is preferable to set the V content to 0.001% or more, and more preferably to 0.005% or more. However, when the V content exceeds 0.050%, the toughness deteriorates. Therefore, when V is added, the V content is set to 0.050% or less.

The balance other than the above is Fe and inevitable impurities. It is noted that the base metal undergoes no remarkable change in its properties if its chemical composition contains at least one selected from the group consisting of Ca: 0.010% or less, B: 0.0050% or less, Sn: 0.050% or less, Sb: 0.050% or less, Zr: 0.050% or less, W: 0.050% or less, Co: 0.050% or less, Mg: 0.020% or less, REM: 0.010% or less, and O: 0.0100% or less in this range.

[Chemical Composition of Cladding Metal]

Next, the chemical composition of the duplex stainless steel plate as a cladding metal will be described.

C: 0.030% or Less

C is one of the elements inevitably present in the steel material. When the C content exceeds 0.030%, precipitation of carbides occurs conspicuously, causing corrosion resistance to deteriorate. Therefore, the C content is 0.030% or less, preferably 0.025% or less, and more preferably 0.020% or less. The C content is preferably 0.001% or more from the viewpoint of production cost.

Si: 1.00% or Less

Si is an element which remarkably promotes precipitation of intermetallic compounds such as sigma phase. To suppress precipitation of intermetallic compounds such as sigma phase, the Si content needs to be 1.00% or less. Therefore, the Si content is 1.00% or less, preferably 0.50% or less, and more preferably 0.40% or less. However, from the viewpoint of production cost, the Si content is preferably 0.01% or more.

Mn: 2.00% or Less

Mn is an element useful for deoxidation, and is preferably contained in an amount of 0.01% or more. On the other hand, when the Mn content exceeds 2.00%, MnS is formed to degrade corrosion resistance. Therefore, the Mn content is 2.00% or less, preferably 1.00% or less, and more preferably 0.80% or less.

P: 0.0400% or Less

A P content of more than 0.0400% can lead to deterioration in toughness and corrosion resistance. Therefore, the P content is 0.0400% or less, preferably 0.0300% or less, and more preferably 0.0200% or less. However, from the viewpoint of the dephosphorization cost, the P content is preferably 0.0001% or more.

S: 0.0100% or Less

A S content of more than 0.0100% can lead to deterioration in hot workability and corrosion resistance. Therefore, the S content is 0.0100% or less, preferably 0.0050% or less, and more preferably 0.0020% or less. However, from the viewpoint of desulfurization cost, the S content is preferably 0.0001% or more.

Ni: 4.50% to 7.00%

Ni is an essential element for stabilizing the austenite phase which is one phase of the duplex stainless steel. This effect is exerted when the Ni content is 4.50% or more. Therefore, the Ni content is 4.50% or more, preferably 4.70% or more, and more preferably 5.00% or more. However, since Ni is an expensive metal, when it is contained in a large amount, the alloy cost itself is increased. Accordingly, the Ni content is 7.00% or less, preferably 6.50% or less, and more preferably 6.00% or less. As described above, the duplex stainless steel has excellent corrosion resistance when the ratio of austenite phase to ferrite phase is 35:65 to 65:35, preferably approximately 1:1. Therefore, in order to satisfy this phase ratio, the Ni content is set to 4.50% to 7.00%.

Cr: 21.0% to 24.0%

Cr is an essential element for ensuring the corrosion resistance of the alloy and for stabilizing the ferrite phase which is the other phase of the duplex stainless steel. To obtain this effect, the Cr content needs to be 21.0% or more. Therefore, the Cr content is 21.0% or more, and preferably 22.0% or more. However, when the Cr content exceeds 24.0%, sigma phase precipitation is promoted, causing an adverse effect on ductility and toughness. Therefore, the Cr content is 24.0% or less, and preferably 23.0% or less. As described above, the duplex stainless steel has excellent corrosion resistance when the ratio of austenite phase to ferrite phase is 35:65 to 65:35, preferably approximately 1:1. Therefore, in order to satisfy this phase ratio, the Cr content is set to 21.0% to 24.0%.

Mo: 2.5% to 3.5%

Mo is also important as an element for improving the corrosion resistance of the alloy. To obtain this effect, the Mo content needs to be 2.5% or more. Therefore, the Mo content is 2.5% or more, and preferably 3.0% or more. However, when the Mo content exceeds 3.5%, sigma phase precipitation is remarkably promoted, causing an adverse effect on ductility and toughness. Therefore, the Mo content is 3.5% or less. As described above, the duplex stainless steel has excellent corrosion resistance when the ratio of austenite phase to ferrite phase is 35:65 to 65:35, preferably approximately 1:1. Therefore, in order to satisfy this phase ratio, the Mo content is set to 2.5% to 3.5%.

N: 0.08% to 0.20%

N is important as an element for increasing the corrosion resistance of the alloy and is also effective for increasing the strength. To obtain this effect, the N content needs to be 0.08% or more. Therefore, the N content is 0.08% or more, preferably 0.10% or more, and more preferably 0.14% or more. However, when the N content exceeds 0.20%, precipitation of nitrides such as $Cr_2N$ is promoted, causing an adverse effect on corrosion resistance. Therefore, the N content is 0.20% or less. As described above, the duplex stainless steel has excellent corrosion resistance when the ratio of austenite phase to ferrite phase is 35:65 to 65:35, preferably approximately 1:1. Therefore, in order to satisfy this phase ratio, the N content is set to 0.08% to 0.20%.

PI: 33.0 to 38.0

PI is a pitting index (pitting corrosion resistance index) defined by:

$$PI = Cr + 3.3Mo + 16N \qquad (2),$$

where the symbol of each element indicates the content in mass % of the element.

The higher the PI value, the better the pitting corrosion resistance is, and from the viewpoint of obtaining sufficient pitting corrosion resistance, the PI value is set to 33.0 or more, and preferably 34.0 or more in the present disclosure. However, when the PI value exceeds 38.0, the risk of precipitation of at least one of sigma phase, carbides, nitrides, or carbonitrides increases and the alloy cost also increases. Therefore, the PI value is set to 38.0 or less, and preferably 37.0 or less.

The PI value calculated by Expression (1) is an index value of the pitting corrosion resistance of the solution-treated material in which the fractions of sigma phase, carbides, and nitrides are 0%. On the other hand, when precipitates such as sigma phase, carbides, nitrides, and carbonitrides are formed, the pitting corrosion resistance is determined by the balance between the PI value and the amounts of Cr and Mo contained in these precipitates. The higher the PI value, the better the pitting corrosion resistance of the base metal. However, when the PI value is high, the content of Cr, Mo, or N naturally increases, and such precipitates tend to form. Then, the amount of precipitated Cr or the amount of precipitated Mo, which will be described later, increases, resulting in a decrease in pitting corrosion resistance. Therefore, in the present disclosure, the PI value ranges from 33.0 to 38.0.

In addition to the above basic components, the steel may further contain, as optional component(s), at least one selected from the group consisting of Cu: 1.50% or less, W: 1.50% or less, Co: 1.50% or less, Ti: 0.25% or less, and Nb: 0.25% or less.

Cu: 1.50% or Less

Cu is an element for increasing corrosion resistance. This effect is exerted when the Cu content is 0.01% or more. Accordingly, in the case of increasing corrosion resistance by adding Cu, it is preferable to set the Cu content to 0.01% or more. However, when the Cu content exceeds 1.50%, hot workability is remarkably deteriorated. Therefore, when Cu is added, the Cu content is set to 1.50% or less, and preferably 1.00% or less.

W: 1.50% or Less

W is an element for increasing the corrosion resistance of the alloy. This effect is exerted when the W content is 0.01% or more. Therefore, in the case of increasing corrosion resistance by adding W, it is preferable to set the W content to 0.01% or more. However, when the W content exceeds 1.50%, sigma phase precipitation is promoted. Therefore, when W is added, the W content is set to 1.50% or less, and preferably 1.00% or less.

Co: 1.50% or Less

Co is also an element that improves corrosion resistance. This effect is exerted when the Co content is 0.01% or more. Therefore, in the case of increasing corrosion resistance by adding Co, it is preferable to set the Co content to 0.01% or more. However, when the Co content exceeds 1.50%, the alloy cost increases. Therefore, when Co is added, the Co content is set to 1.50% or less, and preferably 1.00% or less.

Ti: 0.25% or Less

Ti has a property of being easily bonded to C, and is capable of, when contained in the alloy, delaying precipitation of carbides such as $Cr_{23}C_6$ which is harmful to corrosion resistance. This effect is exerted when the Ti content is 0.01% or more. Therefore, in the case of expecting this effect being accomplished by adding Ti, it is preferable to set the Ti content to 0.01% or more. However, adding Ti beyond 0.25% fails to further increase this effect, but instead the alloy cost increases. Therefore, when Ti is added, the Ti content is set to 0.25% or less, and preferably 0.20% or less.

Nb: 0.25% or Less

As with Ti, Nb also has a property of being easily bonded to C, and is capable of, when contained in the alloy, delaying precipitation of carbides such as $Cr_{23}C_6$ which is harmful to corrosion resistance. This effect is exerted when the Nb content is 0.01% or more. Therefore, in the case of expecting this effect being accomplished by adding Nb, it is preferable to set the Nb content to 0.01% or more. However, adding Nb beyond 0.25% fails to further increase this effect, but instead the alloy cost increases. Therefore, when Nb is added, the Nb content is set to 0.25% or less, and preferably 0.20% or less.

The balance other than the above is Fe and inevitable impurities. It is noted that the cladding metal undergoes no remarkable change in its properties if its chemical composition contains at least one selected from the group consisting of Al: 0.05% or less, V: 0.2% or less, Ca: 0.02% or less, B: 0.01% or less, O: 0.02% or less, Sn: 0.2% or less, Sb: 0.2% or less, Zr: 0.2% or less, Mg: 0.02% or less, REM: 0.2% or less in this range.

[Microstructure of Cladding Metal]

Area Fraction of Ferrite Phase: 35% to 65%

As used herein, the "area fraction of ferrite phase" refers either to a value calculated by the following Expressions (3) to (5) and estimated from the chemical composition of the duplex stainless steel plate, or to a value calculated from a microscope image described later.

area fraction of ferrite phase (%)=4.01Creq−
5.6Nieq−4.13     (3),

Creq=Cr+1.73Si+0.88Mo     (4), and

Nieq=Ni+24.55C+21.75N+0.4Cu     (5)

In Expressions (4) and (5), the symbol of each element indicates the content in mass % of the element, and any element not contained is calculated as 0.

As described above, it is found that the duplex stainless steel plate as the cladding metal exhibits corrosion resistance when the phase fraction of ferrite phase to austenite phase is in the range of 35:65 to 65:35. When the value of area fraction of ferrite phase is 35% to 65%, the phase fraction of ferrite phase and austenite phase is approximately 35:65 to 65:35, and excellent corrosion resistance is exerted. From this viewpoint, the area fraction of ferrite phase is 35% or more, preferably 40% or more, and more preferably 45% or more, and is 65% or less, preferably 60% or less, and more preferably 55% or less.

The area fraction of ferrite phase can be calculated by any known method other than Expression (3), yet, for example, it may be determined by the following method. For ferrite phase, austenite phase, and precipitates (including sigma phase, carbides, nitrides, and carbonitrides), respective area fractions can be calculated by subjecting the duplex stainless steel plate to electrolytic etching and processing the color micrographs taken by an optical microscope with image processing software. It is confirmed that values calculated by this method are correlated with those calculated according to Expression (3). It is noted that the area fraction is 100% in total of ferrite phase+austenite phase+precipitates (including sigma phase, carbides, nitrides, and carbonitrides), and in the case where precipitates are not present (i.e., zero), ferrite phase+austenite phase equals 100%.

[Amount of Precipitated Cr and Amount of Precipitated Mo]

When the microstructure of the cladding metal contains Cr-based precipitates and Mo-based precipitates at least in predetermined amounts, corrosion resistance deteriorates. Therefore, in the present disclosure, it is important that the amount of precipitated Cr and the amount of precipitated Mo (i.e., the amounts of Cr and Mo existing as precipitates) are not greater than a predetermined amount. As used herein, the term "precipitate" refers to one or more selected from the group consisting of sigma phase, carbide, nitride, and carbonitride existing in the microstructure of the cladding metal.

Cr and Mo are generally and widely known as elements forming a passive film. When Cr and/or Mo in the matrix gather in a precipitate, the concentration of Cr and/or Mo in the periphery of the precipitate decreases, and in a corrosive environment, this low-Cr and/or low-Mo region is preferentially corroded. This phenomenon is called sensitization. When the amount of precipitated Cr exceeds 1.00% by mass, sensitization progresses and corrosion resistance deteriorates. Therefore, the amount of precipitated Cr is set to 1.00% or less. Similarly, when the amount of precipitated Mo exceeds 0.50% by mass, sensitization progresses and corrosion resistance deteriorates. Therefore, the amount of precipitated Mo is set to 0.50% or less. The amount of precipitated Cr and the amount of precipitated Mo can be 0.00% or more, respectively.

(Method of Producing Duplex Stainless Clad Steel Plate)

A method of producing a duplex stainless clad steel plate according to one of the embodiments of the present disclosure will be described below. A first blank plate to be the base steel plate can be prepared by a steelmaking process so as to have the above-described chemical composition of the base steel plate, and may be produced in accordance with conventional methods. A second blank plate to be the duplex stainless steel plate as the cladding metal can be prepared by a steelmaking process so as to have the above-described chemical composition of the cladding metal, and may be produced in accordance with conventional methods. The first and second blank plates are piled on top of one another in a layered manner to assemble a clad slab. For example, as illustrated in FIG. 1, a clad slab 10 can be formed by piling one stacked set of a first blank plate 1 and a second blank plate 2 on another in a layered manner such that the second blank plates face each other. At this point, a separating agent 3 can be applied between the second blank plates 2. The separating agent 3 is not particularly limited, yet is preferably a relatively inexpensive one with sufficient separatability, such as $Al_2O_3$. In FIG. 1, reference numeral 4 denotes a spacer, and reference numeral 5 denotes a welded portion. In consideration of warpage during cooling, it is desirable that the first blank plates are equal in thickness to each other, and so are the second blank plates. Of course, there is no need to limit to the assembly method as illustrated in FIG. 1.

The clad slab thus obtained is heated and further subjected to hot rolling to obtain a rolled clad body in which the base steel plate and the duplex stainless steel plate are bonded or joined together.

Heating Temperature: 1050° C. to 1250° C.

The heating temperature is set to 1050° C. or higher in order to ensure the bonding or joining property between the base steel plate and the cladding metal and the toughness of the base steel plate. In the case of a heating temperature below 1050° C., the rolling amount in the high temperature region can not be sufficiently secured and the bonding or joining property deteriorates. Therefore, the heating temperature is set to 1050° C. or higher, and preferably 1100° C. or higher. On the other hand, when the heating temperature exceeds 1250° C., crystal grains remarkably coarsen, and the toughness of the base steel plate deteriorates. Therefore, the heating temperature is 1250° C. or lower.

Rolling Reduction Ratio: 2.0 or More

The term "rolling reduction ratio" refers to "thickness of a clad slab before rolling/thickness of a rolled clad body after rolling". When the clad slab is roll-reduced at high temperature, metals gain bonding force such that a good bonding or joining property is obtained. The rolling reduction ratio is set to 2.0 or more, and preferably 3.0 or more. This setup can provide a good bonding or joining property. In addition, the crystal grains of the base steel plate are refined and the toughness of the base steel plate is improved. The rolling reduction ratio may be 20.0 or less.

Then, after being allowed to naturally cool in the atmosphere or the like, the rolled clad body is reheated to 950° C. to 1100° C.

As used herein, the phrase "allowed to naturally cool" means that the rolled clad body is exposed to the atmosphere without forcible cooling by water injection or the like, and is subjected to air cooling rather than active cooling. As used herein, the term "active cooling" means "to actively cool with a gas, a liquid, or a mixture thereof". In this embodiment, from the viewpoint of increasing corrosion resistance, strength, or toughness, it is preferable not to perform active cooling during reheating after allowing the rolled clad body to naturally cool. It is preferable to set the cooling stop temperature in the natural cooling to 400° C. or lower.

Reheating Temperature: 950° C. to 1100° C.

Reheating is performed after hot rolling in order to ensure the corrosion resistance of the cladding metal. By performing reheating after hot rolling, it is possible to redissolve the precipitates and ensure the corrosion resistance of the cladding metal. When the reheating temperature is below 950° C., precipitation of sigma phase and/or carbonitrides in the duplex stainless steel becomes significant and corrosion resistance deteriorates. Therefore, the reheating temperature is set to 950° C. or higher, and preferably 1000° C. or higher. On the other hand, if the reheating temperature exceeds 1100° C., the crystal grains of the base steel plate coarsen, leading to a remarkable deterioration in the toughness of the base steel plate. Therefore, the reheating temperature is set to 1100° C. or lower, and preferably 1050° C. or lower.

The rolled clad body after reheating is cooled. At this time, the duplex stainless steel plate of the cladding metal and the base steel plate are cooled at different cooling rates.

Cooling Rate of Cladding Metal after Reheating: 0.3° C./s or Higher

If the cooling rate of the cladding metal is below 0.3° C./s, precipitation of sigma phase and/or carbonitrides occurs in the cladding metal, causing deterioration in the corrosion resistance of the cladding metal. Therefore, the cooling rate of the cladding metal is set to 0.3° C./s or higher. The cooling rate of the cladding metal may be set to 100° C./s or lower.

Cooling Rate of Base Steel Plate after Reheating: 1.0° C./s or Higher

When the cooling rate of the base steel plate is below 1.0° C./s, the hardenability of the base metal is not sufficient, causing deterioration in strength and/or toughness. Therefore, the cooling rate of the base steel plate after reheating is set to 1.0° C./s or higher, and preferably 2.0° C./s or higher. The cooling rate of the base steel plate may be 100° C./s or lower.

The cooling rates can be controlled as described above by setting the cooling method and the cooling conditions in consideration of the thicknesses of the base steel plate and the cladding metal and the form of the clad slab. For example, in the case of using the clad slab illustrated in FIG. 1, if the rolled clad material is water-cooled from both sides, the cooling rate of the base steel plate is higher than that of the cladding metal. Further, in the case of using a clad slab in which one first blank plate and one second blank plate are stacked, the cooling rate can be individually controlled for the base steel plate and for the cladding metal by changing the water cooling conditions on respective sides of the rolled clad material. It is noted that the cooling stop temperatures of the cladding metal and the base steel plate after reheating are both preferably lower than 200° C.

Then, so-called tempering treatment whereby the rolled clad body thus cooled is heated at 700° C. or lower is performed.

Tempering Temperature: 700° C. or Lower

The purpose of tempering treatment is to adjust the strength of the base steel plate. By performing tempering treatment, the base steel plate can be adjusted to a desired strength. In addition, tempering treatment is expected to cause a change in the form of carbides such that the toughness improves. However, when tempering treatment is performed at a temperature above 700° C., carbides and/or nitrides precipitate in the cladding metal, resulting in deterioration in corrosion resistance. Therefore, the tempering temperature is 700° C. or lower, and preferably 650° C. or lower. The tempering temperature may be 200° C. or higher.

Optionally, a known step may be further added before or after each step. For example, in the case of using the clad slab illustrated in FIG. 1, the resulting rolled clad body is peeled off with the separating agent applied between the cladding metals to obtain clad steel plates as finished products.

The production method disclosed herein can produce a duplex stainless clad steel plate excellent in all of the corrosion resistance of the cladding metal, the strength and toughness of the base steel plate, and the bonding or joining strength between the cladding metal and the base metal.

EXAMPLES

Various first blank plates (blank materials of base steel plates) having the chemical compositions listed in Table 1 were prepared. Various second blank plates (blank materials of cladding metals) having the chemical compositions and area fractions of ferrite phase listed in Table 2 and made of duplex stainless steel plates were prepared. The area fractions of ferrite phase listed in Table 2 were calculated in accordance with Expression (3). Various duplex stainless clad steel plates listed in Table 4 were produced by applying various production conditions listed in Table 3 to the clad slabs obtained by piling first and second blank plates on top of one another in a layered manner.

TABLE 1

| Base metal No. | Chemical composition (mass %) (with the balance being Fe and inevitable impurities) | | | | | | | | | | | | | | | | Remarks |
|---|---|---|---|---|---|---|---|---|---|---|---|---|---|---|---|---|---|
| | C | Si | Mn | P | S | Al | Mo | Nb | Ti | N | Cu | Cr | Ni | V | Nb/N | Ceq | |
| 1 | 0.14 | 0.24 | 1.45 | 0.006 | 0.005 | 0.053 | 0.09 | 0.024 | <0.001 | 0.0035 | | | | | 6.9 | 0.40 | Example steel |
| 2 | 0.06 | 0.32 | 1.58 | 0.002 | 0.008 | 0.021 | 0.12 | 0.037 | 0.003 | 0.0023 | | | | | 16.1 | 0.35 | Example steel |
| 3 | 0.25 | 0.13 | 1.09 | 0.009 | 0.006 | 0.049 | 0.10 | 0.027 | <0.001 | 0.0064 | | | | | 4.2 | 0.45 | Example steel |
| 4 | 0.14 | 0.34 | 1.25 | 0.015 | 0.005 | 0.032 | 0.05 | 0.022 | <0.001 | 0.0066 | | | | | 3.3 | 0.36 | Example steel |
| 5 | 0.19 | 0.24 | 1.29 | 0.029 | 0.009 | 0.047 | 0.06 | 0.010 | <0.001 | 0.0021 | | | | | 4.8 | 0.42 | Example steel |
| 6 | 0.15 | 0.29 | 1.25 | 0.010 | 0.002 | 0.098 | 0.11 | 0.040 | 0.002 | 0.0061 | | | | | 6.6 | 0.38 | Example steel |
| 7 | 0.16 | 0.32 | 1.25 | 0.006 | 0.006 | 0.062 | 0.08 | 0.031 | 0.004 | 0.0051 | | | | | 6.1 | 0.38 | Example steel |
| 8 | 0.17 | 0.40 | 1.21 | 0.001 | 0.010 | 0.016 | 0.06 | 0.019 | 0.001 | 0.0010 | | | | | 19.0 | 0.38 | Example steel |
| 9 | 0.15 | 0.36 | 1.22 | 0.006 | 0.008 | 0.036 | 0.13 | 0.037 | 0.001 | 0.0098 | | | | | 3.8 | 0.38 | Example steel |
| 10 | 0.19 | 0.12 | 1.37 | 0.006 | 0.003 | 0.050 | 0.05 | 0.036 | <0.001 | 0.0061 | 0.01 | | 0.01 | | 5.9 | 0.43 | Example steel |
| 11 | 0.13 | 0.28 | 1.38 | 0.019 | 0.009 | 0.049 | 0.13 | 0.034 | <0.001 | 0.0051 | | 0.02 | | 0.001 | 6.7 | 0.39 | Example steel |
| 12 | 0.15 | 0.31 | 1.34 | 0.004 | 0.003 | 0.024 | 0.07 | 0.018 | <0.001 | 0.0060 | | | | | 3.0 | 0.39 | Example steel |
| <u>13</u> | <u>0.26</u> | 0.41 | 1.05 | 0.010 | 0.008 | 0.030 | 0.06 | 0.025 | <0.001 | 0.0033 | | | | | 7.6 | 0.45 | Comparative steel |
| <u>14</u> | 0.12 | 0.12 | 1.38 | 0.017 | 0.001 | 0.045 | 0.09 | <u>0.009</u> | <0.001 | 0.0021 | | | | | 4.3 | 0.37 | Comparative steel |
| <u>15</u> | 0.17 | 0.31 | 1.29 | 0.017 | 0.008 | 0.041 | 0.11 | <u>0.041</u> | 0.003 | 0.0042 | | | | | 9.8 | 0.41 | Comparative steel |
| <u>16</u> | 0.18 | 0.32 | 1.36 | 0.008 | 0.006 | 0.024 | 0.08 | 0.021 | <u>0.005</u> | 0.0039 | | | | | 5.4 | 0.42 | Comparative steel |
| <u>17</u> | 0.14 | 0.24 | 1.27 | 0.009 | 0.005 | 0.022 | 0.05 | 0.015 | <0.001 | <u>0.0008</u> | | | | | 18.8 | 0.36 | Comparative steel |
| <u>18</u> | 0.19 | 0.29 | 1.25 | 0.004 | 0.001 | 0.052 | 0.09 | 0.037 | <0.001 | <u>0.0103</u> | | | | | 3.6 | 0.42 | Comparative steel |

TABLE 1-continued

| Base metal No. | Chemical composition (mass %) (with the balance being Fe and inevitable impurities) | | | | | | | | | | | | | | Nb/N | Ceq | Remarks |
|---|---|---|---|---|---|---|---|---|---|---|---|---|---|---|---|---|---|
| | C | Si | Mn | P | S | Al | Mo | Nb | Ti | N | Cu | Cr | Ni | V | | | |
| <u>19</u> | 0.17 | 0.32 | 1.14 | 0.021 | 0.004 | 0.031 | 0.09 | 0.021 | <0.001 | 0.0072 | | | | | <u>2.9</u> | 0.38 | Comparative steel |
| <u>20</u> | 0.11 | 0.33 | 1.30 | 0.001 | 0.001 | 0.053 | 0.07 | 0.038 | 0.002 | 0.0067 | | | | | 5.7 | <u>0.34</u> | Comparative steel |
| <u>21</u> | 0.22 | 0.12 | 1.38 | 0.014 | 0.002 | 0.053 | 0.06 | 0.025 | <0.001 | 0.0055 | | | | | 4.5 | <u>0.46</u> | Comparative steel |

Note:
Underlined if outside the range of the disclosure.

TABLE 2

| Cladding metal No. | Chemical composition (mass %) (with the balance being Fe and inevitable impurities) | | | | | | | | | | | | | | | PI | Creq | Nieq | Area fraction of ferrite phase (%) | Remarks |
|---|---|---|---|---|---|---|---|---|---|---|---|---|---|---|---|---|---|---|---|---|
| | C | Si | Mn | P | S | Ni | Cr | Mo | N | Cu | W | Co | Ti | Nb | | | | | |
| 1 | 0.019 | 0.37 | 0.97 | 0.0269 | 0.0034 | 4.56 | 22.8 | 3.4 | 0.19 | — | — | — | — | — | 37.1 | 26.43 | 9.16 | 51 | Example steel |
| 2 | 0.011 | 0.05 | 0.56 | 0.0259 | 0.0033 | 5.18 | 22.3 | 3.2 | 0.15 | 0.01 | 0.01 | — | — | — | 35.3 | 25.20 | 8.71 | 48 | Example steel |
| 3 | 0.024 | 0.08 | 0.36 | 0.0232 | 0.0033 | 5.84 | 23.4 | 3.4 | 0.16 | — | — | 0.02 | — | — | 37.2 | 26.53 | 9.91 | 47 | Example steel |
| 4 | 0.029 | 0.37 | 0.48 | 0.0223 | 0.0033 | 6.04 | 22.8 | 3.1 | 0.14 | — | — | — | 0.02 | 0.02 | 35.3 | 26.17 | 9.80 | 46 | Example steel |
| 5 | 0.017 | 0.41 | 0.71 | 0.0268 | 0.0031 | 4.50 | 22.5 | 3.0 | 0.15 | — | — | — | — | — | 34.8 | 25.85 | 8.18 | 54 | Example steel |
| 6 | 0.020 | 0.14 | 0.89 | 0.0166 | 0.0015 | 6.97 | 23.8 | 3.4 | 0.15 | — | — | — | — | — | 37.4 | 27.03 | 10.72 | 44 | Example steel |
| 7 | 0.012 | 0.26 | 0.32 | 0.0253 | 0.0011 | 4.73 | 21.0 | 3.3 | 0.16 | — | — | — | — | — | 34.5 | 24.35 | 8.50 | 46 | Example steel |
| 8 | 0.023 | 0.47 | 0.30 | 0.0138 | 0.0029 | 4.74 | 23.9 | 3.0 | 0.19 | — | — | — | — | — | 36.8 | 27.35 | 9.44 | 53 | Example steel |
| 9 | 0.018 | 0.21 | 0.38 | 0.0263 | 0.0018 | 6.00 | 23.5 | 2.5 | 0.15 | — | — | — | — | — | 34.2 | 26.06 | 9.70 | 46 | Example steel |
| 10 | 0.023 | 0.30 | 0.37 | 0.0179 | 0.0026 | 5.37 | 22.5 | 3.5 | 0.17 | — | — | — | — | — | 36.8 | 26.10 | 9.63 | 47 | Example steel |
| 11 | 0.017 | 0.13 | 0.50 | 0.0247 | 0.0041 | 5.88 | 22.9 | 3.1 | 0.08 | — | — | — | — | — | 34.4 | 25.85 | 8.04 | 55 | Example steel |
| 12 | 0.023 | 0.05 | 0.25 | 0.0113 | 0.0008 | 4.50 | 23.2 | 3.1 | 0.20 | — | — | — | — | — | 36.6 | 26.01 | 9.41 | 47 | Example steel |
| 13 | 0.017 | 0.32 | 0.46 | 0.0296 | 0.0023 | 5.52 | 21.4 | 2.8 | 0.15 | — | — | — | — | — | 33.0 | 24.42 | 9.20 | 42 | Example steel |
| 14 | 0.012 | 0.11 | 0.72 | 0.0280 | 0.0048 | 5.62 | 23.7 | 3.4 | 0.19 | — | — | — | — | — | 38.0 | 26.88 | 10.05 | 47 | Example steel |
| 15 | 0.011 | 0.21 | 0.37 | 0.0210 | 0.0040 | 6.51 | 21.1 | 3.2 | 0.17 | — | — | — | — | — | 34.4 | 24.28 | 10.48 | 35 | Example steel |
| 16 | 0.009 | 0.31 | 0.44 | 0.0178 | 0.0025 | 4.61 | 23.8 | 3.4 | 0.11 | — | — | — | — | — | 36.8 | 27.33 | 7.22 | 65 | Example steel |
| 17 | <u>0.031</u> | 0.24 | 0.59 | 0.0116 | 0.0045 | 4.80 | 22.4 | 3.2 | 0.15 | — | — | — | — | — | 35.4 | 25.63 | 8.82 | 49 | Comparative steel |
| <u>18</u> | 0.022 | 0.10 | 0.33 | 0.0284 | 0.0030 | <u>4.48</u> | 24.0 | 3.5 | 0.09 | — | — | — | — | — | 37.0 | 27.25 | 6.98 | <u>66</u> | Comparative steel |
| <u>19</u> | 0.021 | 0.18 | 0.71 | 0.0192 | 0.0039 | <u>7.01</u> | 22.8 | 2.6 | 0.18 | — | — | — | — | — | 34.3 | 25.40 | 11.44 | <u>34</u> | Comparative steel |
| <u>20</u> | 0.014 | 0.20 | 0.31 | 0.0132 | 0.0047 | 6.16 | <u>20.8</u> | 3.1 | 0.14 | — | — | — | — | — | 33.3 | 23.87 | 9.55 | 38 | Comparative steel |
| <u>21</u> | 0.024 | 0.49 | 0.83 | 0.0170 | 0.0021 | 6.18 | 22.7 | <u>2.4</u> | 0.17 | — | — | — | — | — | 33.3 | 25.66 | 10.47 | 40 | Comparative steel |
| <u>22</u> | 0.012 | 0.46 | 0.90 | 0.0197 | 0.0027 | 5.13 | 23.5 | <u>3.6</u> | 0.19 | — | — | — | — | — | <u>38.4</u> | 27.46 | 9.56 | 52 | Comparative steel |
| <u>23</u> | 0.008 | 0.46 | 0.31 | 0.0161 | 0.0020 | 5.12 | 22.8 | 3.2 | <u>0.07</u> | — | — | — | — | — | 34.5 | 26.41 | 6.84 | 63 | Comparative steel |
| <u>24</u> | 0.023 | 0.06 | 0.86 | 0.0147 | 0.0009 | 6.36 | 23.9 | 3.1 | <u>0.21</u> | — | — | — | — | — | 37.5 | 26.73 | 11.49 | 39 | Comparative steel |
| <u>25</u> | 0.010 | 0.41 | 0.76 | 0.0262 | 0.0013 | 5.06 | 21.1 | 2.8 | 0.16 | — | — | — | — | — | <u>32.9</u> | 24.27 | 8.79 | 44 | Comparative steel |
| <u>26</u> | 0.014 | 0.38 | 0.67 | 0.0198 | 0.0022 | 6.34 | 23.8 | 3.5 | 0.17 | — | — | — | — | — | <u>38.1</u> | 27.54 | 10.38 | 48 | Comparative steel |

Note:
Underlined if outside the range of the disclosure.

TABLE 3

| Production method No. | Hot rolling | | Quenching treatment | | | Tempering |
|---|---|---|---|---|---|---|
| | Heating temp. (° C.) | Rolling reduction ratio | Reheating temp. (° C.) | Cooling rate of cladding metal (° C./s) | Cooling rate of base metal (° C./s) | Heating temp. (° C.) |
| 1 | 1200 | 4.8 | 1000 | 1.5 | 2.8 | 600 |
| 2 | 1050 | 3.8 | 1050 | 1.9 | 3.8 | 650 |
| 3 | 1250 | 5.2 | 1050 | 2.3 | 5.2 | 630 |
| 4 | 1200 | 2.0 | 1050 | 0.6 | 1.6 | 580 |
| 5 | 1150 | 7.9 | 950 | 5.1 | 2.5 | 500 |
| 6 | 1200 | 11.0 | 1100 | 12.4 | 19.4 | 620 |
| 7 | 1200 | 3.2 | 1000 | 0.3 | 1.5 | 610 |
| 8 | 1150 | 7.6 | 1050 | 5.4 | 1.0 | 630 |
| 9 | 1100 | 6.8 | 1050 | 6.9 | 2.6 | 700 |
| <u>10</u> | <u>1040</u> | 4.2 | 1050 | 2.8 | 7.1 | 630 |
| <u>11</u> | <u>1260</u> | 5.3 | 1050 | 0.7 | 1.4 | 650 |
| <u>12</u> | 1100 | <u>1.9</u> | 1000 | 0.5 | 1.8 | 590 |
| <u>13</u> | 1200 | 3.9 | <u>940</u> | 1.6 | 3.9 | 530 |
| <u>14</u> | 1150 | 11.6 | <u>1120</u> | 10.7 | 16.3 | 580 |
| <u>15</u> | 1150 | 3.1 | 1050 | <u>0.2</u> | 1.3 | 630 |
| <u>16</u> | 1100 | 2.7 | 1000 | 7.4 | <u>0.9</u> | 670 |
| <u>17</u> | 1200 | 5.7 | 1050 | 10.3 | 1.9 | <u>710</u> |

Note:
Underlined if outside the range of the disclosure.

For the obtained clad steel plates, the following evaluations were carried out and the results are listed in Table 4.

(1) Measurement of the Amount of Precipitated Cr and the Amount of Precipitated Mo For extraction of precipitates in the cladding metal, electrolytic extraction in a 10 vol % acetylacetone—1 mass % tetramethylammonium chloride—methanol mixed solution (commonly referred to as 10% AA solution) was applied (this electrolytic extraction is commonly referred to as SPEED method). The extraction residue collected on the filter by filtration was dissolved in a mixed acid (with a mixed acid component ratio of sulfuric acid 10 mL:nitric acid 10 mL:perchloric acid 5 mL:water 10 mL), and analyzed by inductively coupled plasma (ICP) emission spectroscopy to determine the amount of precipitated Cr and the amount of precipitated Mo.

(2) Evaluation of Corrosion Resistance (Pitting Corrosion Resistance) of Cladding Metal The corrosion resistance was evaluated in accordance with ASTM G48—Test Method (E). In the test method, each specimen was immersed in a 6% $FeCl_3$ aqueous solution heated to 20±2° C. for 24 hours, and was judged as having good corrosion resistance when pitting corrosion having a depth of 25 μm or more did not occur on the surface of the cladding metal after the test.

(3) Evaluation of Bonding or Joining Strength

The bonding or joining strength between the cladding metal and the base metal was evaluated in accordance with JIS G0601—Shear Strength Test. The shear strength test is a method of evaluating the bonding or joining property from the maximum shear strength required for the separation of the cladding metal from the base metal in parallel to the bonding or joining surface. The bonding or joining property was judged as good when the shear strength was 200 MPa or more.

(4) Evaluation of Toughness of Base Steel Plate

The toughness of each base steel plate was evaluated by Charpy impact test. From each base steel plate, a 10 mm×10 mm size V-notch Charpy impact test specimen prescribed in JIS Z 2242 was sampled and subjected to Charpy impact test. The toughness was judged as good when the value of Charpy impact absorbed energy at −20° C. ($vE_{-20}$) was greater than 100 J.

(5) Evaluation of Strength of Base Steel Plate

The strength of each base metal was evaluated by tensile test. A JIS 1A tensile test piece was collected from a region where only the base metal is present as a result of removing the cladding metal from the clad steel plate by machining, and subjected to a tensile test. The tempering temperature was adjusted such that the tensile strength was about 550 MPa.

TABLE 4

| Clad steel plate No. | Base metal No. | Cladding metal No. | Production method No. | Amoung of precipitated Cr (mass %) | Amount of precipitated Mo (mass %) | Pitting corrosion | Shear stress (Mpa) | Tensile strength (Mpa) | vE-20 (J) | Remarks |
|---|---|---|---|---|---|---|---|---|---|---|
| 1 | 1 | 1 | 1 | 0.03 | 0.00 | not occurred | 321 | 557 | 231 | Example |
| 2 | 2 | 2 | 2 | 0.00 | 0.00 | not occurred | 225 | 565 | 221 | Example |
| 3 | 3 | 3 | 3 | 0.09 | 0.02 | not occurred | 328 | 564 | 179 | Example |
| 4 | 4 | 4 | 4 | 0.01 | 0.03 | not occurred | 236 | 542 | 182 | Example |
| 5 | 5 | 5 | 5 | 0.10 | 0.08 | not occurred | 314 | 542 | 257 | Example |
| 6 | 6 | 6 | 6 | 0.02 | 0.04 | not occurred | 302 | 541 | 164 | Example |
| 7 | 7 | 7 | 7 | 0.06 | 0.09 | not occurred | 302 | 538 | 189 | Example |
| 8 | 8 | 8 | 8 | 0.91 | 0.10 | not occurred | 291 | 542 | 177 | Example |
| 9 | 9 | 9 | 9 | 0.06 | 0.02 | not occurred | 320 | 530 | 165 | Example |
| 10 | 10 | 10 | 1 | 0.05 | 0.41 | not occurred | 313 | 558 | 289 | Example |
| 11 | 11 | 11 | 1 | 0.07 | 0.08 | not occurred | 296 | 551 | 263 | Example |
| 12 | 12 | 12 | 1 | 0.81 | 0.08 | not occurred | 319 | 531 | 143 | Example |

TABLE 4-continued

| Clad steel plate No. | Base metal No. | Cladding metal No. | Production method No. | Amoung of precipitated Cr (mass %) | Amount of precipitated Mo (mass %) | Pitting corrosion | Shear stress (Mpa) | Tensile strength (Mpa) | vE-20 (J) | Remarks |
|---|---|---|---|---|---|---|---|---|---|---|
| 13 | 1 | 13 | 1 | 0.04 | 0.07 | not occurred | 303 | 548 | 245 | Example |
| 14 | 1 | 14 | 1 | 0.71 | 0.30 | not occurred | 301 | 567 | 239 | Example |
| 15 | 1 | 15 | 1 | 0.04 | 0.05 | not occurred | 295 | 564 | 261 | Example |
| 16 | 1 | 16 | 1 | 0.04 | 0.09 | not occurred | 288 | 548 | 251 | Example |
| 17 | 4 | 1 | 1 | 0.02 | 0.00 | not occurred | 325 | 567 | 189 | Example |
| 18 | 12 | 1 | 1 | 0.03 | 0.00 | not occurred | 315 | 563 | 151 | Example |
| 19 | 1 | _17_ | 1 | _1.21_ | 0.10 | _occurred_ | 309 | 556 | 244 | Comparative example |
| 20 | 1 | _18_ | 1 | 0.03 | 0.03 | _occurred_ | 286 | 539 | 231 | Comparative example |
| 21 | 1 | _19_ | 1 | 0.04 | 0.03 | _occurred_ | 303 | 547 | 235 | Comparative example |
| 22 | 1 | _20_ | 1 | 0.06 | 0.03 | _occurred_ | 322 | 568 | 246 | Comparative example |
| 23 | 1 | _21_ | 1 | 0.05 | 0.04 | _occurred_ | 315 | 566 | 246 | Comparative example |
| 24 | 1 | _22_ | 1 | 0.02 | _0.53_ | _occurred_ | 324 | 537 | 249 | Comparative example |
| 25 | 1 | _23_ | 1 | 0.06 | 0.04 | _occurred_ | 282 | 532 | 247 | Comparative example |
| 26 | 1 | _24_ | 1 | _1.23_ | 0.01 | _occurred_ | 288 | 543 | 238 | Comparative example |
| 27 | 1 | _25_ | 1 | 0.09 | 0.03 | _occurred_ | 326 | 549 | 249 | Comparative example |
| 28 | 1 | _26_ | 1 | _1.13_ | _0.51_ | _occurred_ | 319 | 534 | 256 | Comparative example |
| 29 | _13_ | 1 | 1 | 0.01 | 0.00 | not occurred | 292 | 566 | _81_ | Comparative example |
| 30 | _14_ | 1 | 1 | 0.03 | 0.00 | not occurred | 299 | 569 | _83_ | Comparative example |
| 31 | _15_ | 1 | 1 | 0.02 | 0.00 | not occurred | 292 | 531 | _67_ | Comparative example |
| 32 | _16_ | 1 | 1 | 0.02 | 0.00 | not occurred | 289 | 541 | _91_ | Comparative example |
| 33 | _17_ | 1 | 1 | 0.01 | 0.00 | not occurred | 295 | 559 | _65_ | Comparative example |
| 34 | _18_ | 1 | 1 | 0.01 | 0.00 | not occurred | 292 | 544 | _71_ | Comparative example |
| 35 | _19_ | 1 | 1 | 0.02 | 0.00 | not occurred | 297 | 555 | _73_ | Comparative example |
| 36 | _20_ | 1 | 1 | 0.00 | 0.00 | not occurred | 291 | 544 | _69_ | Comparative example |
| 37 | _21_ | 1 | 1 | 0.03 | 0.00 | not occurred | 307 | 547 | _53_ | Comparative example |
| 38 | _13_ | _17_ | 10 | _1.14_ | 0.10 | _occurred_ | _151_ | 532 | _64_ | Comparative example |
| 39 | _13_ | _17_ | _11_ | _1.21_ | 0.03 | _occurred_ | 300 | 563 | _21_ | Comparative example |
| 40 | _13_ | _17_ | _12_ | _1.09_ | 0.03 | _occurred_ | _134_ | 566 | _16_ | Comparative example |
| 41 | _13_ | _17_ | _13_ | _2.18_ | _0.67_ | _occurred_ | 287 | 554 | _61_ | Comparative example |
| 42 | _13_ | _17_ | _14_ | _1.25_ | 0.03 | _occurred_ | 288 | 563 | _17_ | Comparative example |
| 43 | _13_ | _17_ | _15_ | _1.95_ | _0.69_ | _occurred_ | 291 | 561 | _54_ | Comparative example |
| 44 | _13_ | _17_ | _16_ | _1.54_ | 0.03 | _occurred_ | 319 | 536 | _19_ | Comparative example |
| 45 | _13_ | _17_ | _17_ | _1.38_ | 0.01 | _occurred_ | 316 | 555 | _59_ | Comparative example |
| 46 | 1 | 1 | _13_ | _1.15_ | 0.16 | _occurred_ | 341 | 546 | 216 | Comparative example |
| 47 | 1 | 1 | _15_ | _1.08_ | 0.08 | _occurred_ | 336 | 552 | 224 | Comparative example |
| 48 | 1 | 1 | _17_ | _1.24_ | 0.10 | _occurred_ | 328 | 549 | 219 | Comparative example |

Note:
Underlined if outside the range of the disclosure.

The clad steel plates of Nos. 1 to 18 according to examples exhibited good corrosion resistance and toughness. The clad steel plates of Nos. 19 to 28 having the chemical compositions of the cladding metals outside the range of the present disclosure were inferior in corrosion resistance. The clad steel plates of Nos. 29 to 37 having the chemical compositions of the base metals outside the range of the present disclosure were inferior in toughness. Further, the clad steel plates of Nos. 38 to 45 having the chemical compositions of the cladding metals and the chemical compositions of the base metals outside the range of the present disclosure were inferior in both corrosion resistance and toughness. Among these, the clad steel plate of No. 38, which has a heating temperature below the range of the present disclosure, and the clad steel plate of No. 40, in which the rolling reduction ratio is below the range of the present disclosure, had a shear strength of less than 200 MPa and were inferior in the bonding or joining property. In the clad steel plates of Nos. 46 to 48 whose production conditions are outside the range of the present disclosure, the amount of precipitated Cr was outside the range of the present disclosure, and as a result, the corrosion resistance was inferior.

REFERENCE SIGNS LIST

1 first blank plate (blank material of base steel plate)
2 second blank plate (blank material of cladding metal)
3 separating agent
4 spacer
5 welded portion
10 clad slab

The invention claimed is:

1. A duplex stainless clad steel plate in which a duplex stainless steel plate as a cladding metal is bonded or joined to one or both surfaces of a base steel plate, wherein
the base steel plate comprises a first chemical composition containing, in mass %, C: 0.06% to 0.25%, Si: 0.05% to 0.50%, Mn: 0.70% to 1.60%, P: 0.030% or less, S: 0.010% or less, Al: 0.005% to 0.100%, Mo: 0.01% to 0.15%, Nb: 0.010% to 0.040%, Ti: less than 0.005%, and N: 0.0010% to 0.0100%, optionally at least one selected from the group consisting of Cu: 0.50% or less, Ni: 0.50% or less, Cr: 0.40% or less, and V: 0.050% or less, with the balance being Fe and inevitable impurities, in a range such that Nb/N is 3.0 or more and Ceq represented by the following Expression (1) is 0.35 to 0.45:

$$Ceq = C + Mn/6 + (Cu+Ni)/15 + (Cr+Mo+v)/5 \quad (1)$$

where the symbol of each element indicates the content in mass % of the element, and any element not contained is calculated as 0,
the duplex stainless steel plate comprises:
a second chemical composition containing, in mass %, C: 0.030% or less, Si: 1.00% or less, Mn: 2.00% or less, P: 0.0400% or less, S: 0.0100% or less, Ni: 4.50% to 7.00%, Cr: 21.0% to 24.0%, Mo: 2.5% to 3.5%, and N: 0.08% to 0.20%, optionally at least one selected from the group consisting of Cu: 1.50% or less, W: 1.50% or less, Co: 1.50% or less, Ti: 0.25% or less, and Nb: 0.25 or less, with the balance being Fe and inevitable impurities, in a range such that PI defined by the following Expression (2) is 33.0 to 38.0:

$$PI = Cr + 3.3Mo + 16N \qquad (2)$$

where the symbol of each element indicates the content in mass % of the element; and a microstructure containing a ferrite phase in an area fraction of 35% to 65%, and in the microstructure, an amount of precipitated Cr is 1.00 mass % or less and an amount of precipitated Mo is 0.50 mass % or less.

2. A method of producing a duplex stainless clad steel plate in which a duplex stainless steel plate as a cladding metal is bonded or joined to one or both surfaces of a base steel plate, the method comprising:

preparing a clad slab by stacking a first blank plate to be the base steel plate and a second blank plate to be the duplex stainless steel plate as the cladding metal in a layered manner, the first blank plate comprising the first chemical composition as recited in claim 1, and the second blank plate comprising the second chemical composition as recited in claim 1 and a microstructure containing a ferrite phase in an area fraction of 35% to 65%;

heating the clad slab to 1050° C. to 1250° C.;

then hot rolling the clad slab with a rolling reduction ratio of 2.0 or more to obtain a rolled clad body in which the base steel plate and the duplex stainless steel plate are bonded or joined together;

allowing the rolled clad body to naturally cool;

then reheating the rolled clad body to 950° C. to 1100° C.;

then cooling the rolled clad body such that the duplex stainless steel plate is cooled at a cooling rate of 0.3° C./s or higher and the base steel plate is cooled at a cooling rate of 1.0° C./s or higher; and then tempering the rolled clad body at 700° C. or lower to produce the duplex stainless clad steel plate of claim 1.

* * * * *